(12) United States Patent
Yeh et al.

(10) Patent No.: US 7,990,697 B2
(45) Date of Patent: Aug. 2, 2011

(54) MOUNTING MECHANISM FOR STORAGE DEVICE

(75) Inventors: Chin-Wen Yeh, Taipei Hsien (TW); Zhi-Jian Peng, Shenzhen (CN); Chen-Liang Geng, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 139 days.

(21) Appl. No.: 12/464,541

(22) Filed: May 12, 2009

(65) Prior Publication Data

US 2010/0163698 A1    Jul. 1, 2010

(30) Foreign Application Priority Data

Dec. 31, 2008    (CN) .......................... 2008 2 0303966

(51) Int. Cl.
*G06F 1/16*    (2006.01)
*H05K 5/00*    (2006.01)
*H05K 7/00*    (2006.01)

(52) U.S. Cl. ................................. 361/679.33

(58) Field of Classification Search ............. 361/679.33, 361/679.01, 679.02
See application file for complete search history.

(56) References Cited

U.S. PATENT DOCUMENTS

| | | | | |
|---|---|---|---|---|
| 6,751,100 B2 * | 6/2004 | Chen | | 361/725 |
| 7,450,376 B2 * | 11/2008 | Chen et al. | | 361/679.33 |
| 7,525,795 B2 * | 4/2009 | Cheng | | 361/679.33 |
| 7,697,279 B2 * | 4/2010 | Yeh et al. | | 361/679.39 |
| 2003/0193782 A1 * | 10/2003 | Chen | | 361/726 |
| 2005/0152107 A1 * | 7/2005 | Chen et al. | | 361/683 |
| 2006/0227502 A1 * | 10/2006 | Cheng | | 361/685 |
| 2007/0025068 A1 * | 2/2007 | Chen et al. | | 361/679 |
| 2007/0139902 A1 * | 6/2007 | Chen et al. | | 361/796 |
| 2007/0153451 A1 * | 7/2007 | Chen et al. | | 361/679 |
| 2008/0116091 A1 * | 5/2008 | Chen et al. | | 206/307 |
| 2008/0116774 A1 * | 5/2008 | Chen et al. | | 312/223.2 |
| 2008/0123280 A1 * | 5/2008 | Chen et al. | | 361/685 |
| 2008/0130245 A1 * | 6/2008 | Chen et al. | | 361/726 |
| 2008/0137280 A1 * | 6/2008 | Chen et al. | | 361/685 |
| 2008/0137281 A1 * | 6/2008 | Chen et al. | | 361/685 |
| 2008/0151523 A1 * | 6/2008 | Chen et al. | | 361/807 |
| 2008/0157638 A1 * | 7/2008 | Liu et al. | | 312/223.2 |
| 2008/0158809 A1 * | 7/2008 | Chen et al. | | 361/685 |
| 2008/0218958 A1 * | 9/2008 | Chen et al. | | 361/684 |
| 2009/0168323 A1 * | 7/2009 | Yeh et al. | | 361/679.33 |
| 2010/0163699 A1 * | 7/2010 | Yeh et al. | | 248/225.11 |

* cited by examiner

*Primary Examiner* — Jinhee Lee
*Assistant Examiner* — Adrian S Wilson
(74) *Attorney, Agent, or Firm* — D. Austin Bonderer

(57) ABSTRACT

A mounting mechanism for a storage device having at least one sliding member includes a bracket and a pressing member. The bracket includes a sidewall defining at least one opening for receiving said sliding member of the storage device. The pressing member attached to the sidewall of the bracket for sandwiching the storage device between a bottom surface of the pressing member and the bracket.

14 Claims, 3 Drawing Sheets

MOUNTING MECHANISM FOR STORAGE DEVICE

BACKGROUND

1. Technical Field

The present disclosure relates to a mounting mechanism, and particularly, to a mounting mechanism which facilitates attachment of a storage device to a computer chassis.

2. Description of Related Art

Computers have been widely used in modern life. It is desirable for a user or technician to conveniently access internal components such as storage devices, expansion cards and motherboard for purpose of service or replace. However, storage devices, such as hard disk drives, compact disk read-only memory (CD-ROM) drives, digital video disc (DVD) drives, floppy disk drives, and the like are typically secured in computer chassis with screws or bolts. It is complicated and time-consuming to operate threaded elements.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
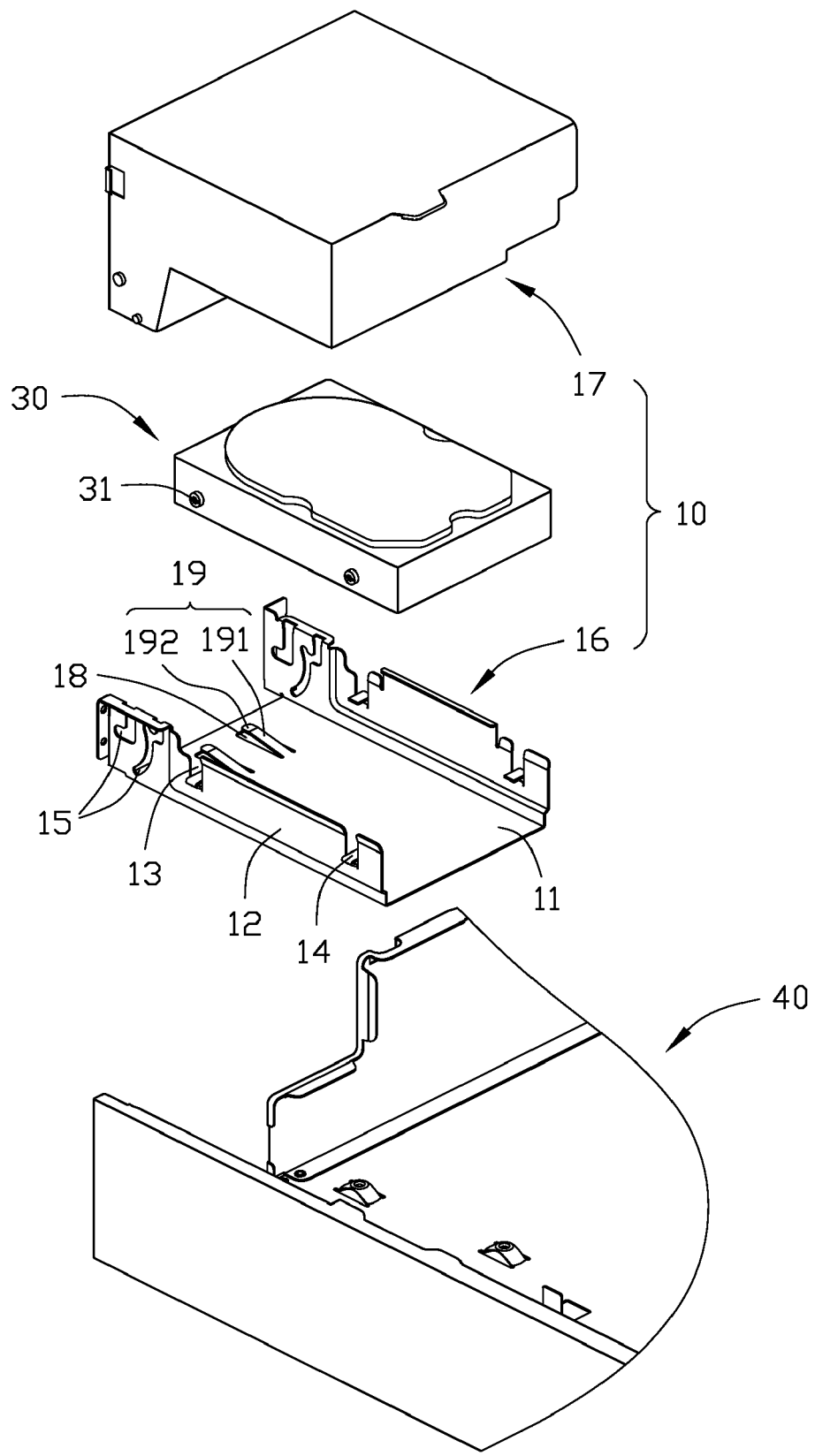
FIG. 1 is an exploded, isometric view of an embodiment of a mounting mechanism together with a storage device, the mounting mechanism comprising a computer chassis, a bracket, and a pressing member.
Figure 2:
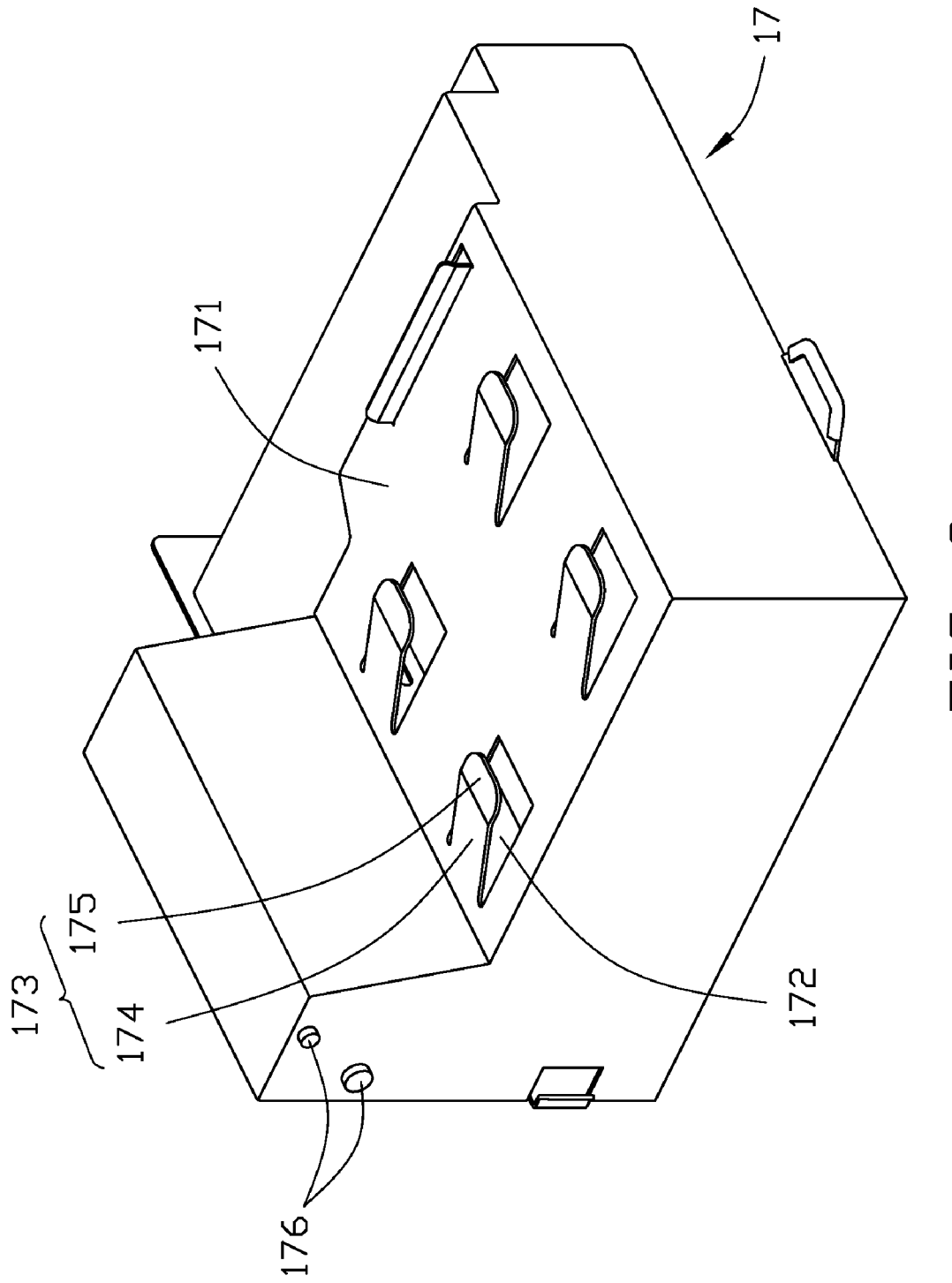
FIG. 2 is an isometric view of the pressing member shown in FIG. 1, but viewed from another aspect.

Referring to FIGS. 1 and 2, an embodiment of a mounting mechanism 10 is provided for holding a storage device 30 in a computer chassis 40. The mounting mechanism 10 comprises a bracket 16 attached to the computer chassis 40, and a pressing member 17 such as a power supply.

The bracket 16 comprises a bottom wall 11, and a pair of sidewalls 12 extended perpendicularly from two side edges of the bottom wall 11. A plurality of slots 18, and a plurality of biasing members 19 extended from the corresponding slots 18 are formed on the bottom wall 11. Each biasing member 19 includes an elastic element 191 that extends from an edge of the corresponding slot 18, and a horizontal member 192 that horizontally extends from an edge of the elastic element 191. Each sidewall 12 includes a plurality of openings 13, and a plurality of supporting members 14 formed at a bottom portion of the corresponding openings 13. A plurality of fixing slots 15 are formed at a back portion of each sidewall 12 away from the openings 13.

Referring to FIG. 2, the pressing member 17 includes a plurality of slots 172 and a plurality of biasing members 173 extending from the slots 172 on a bottom surface 171 of the pressing member 17. Each biasing member 173 includes an elastic element 174 that extends from the corresponding slot 172, and a horizontal member 175 that horizontally extends from an edge of the elastic element 174. A plurality of fixing protrusions 176 are formed at a back portion of the two sides of the pressing member 17 configured for engaging with the pluralities of fixing slots 15 of the bracket 16. A plurality of screw holes (not labeled) are formed at back portions of the bracket 16 and the pressing member 17. The bracket 16 and the pressing member 17 are capable of being fixed on a back plate (not labeled) of the computer chassis 40 by the screw holes (not labeled) and corresponding screws (not labeled).

Figure 3:
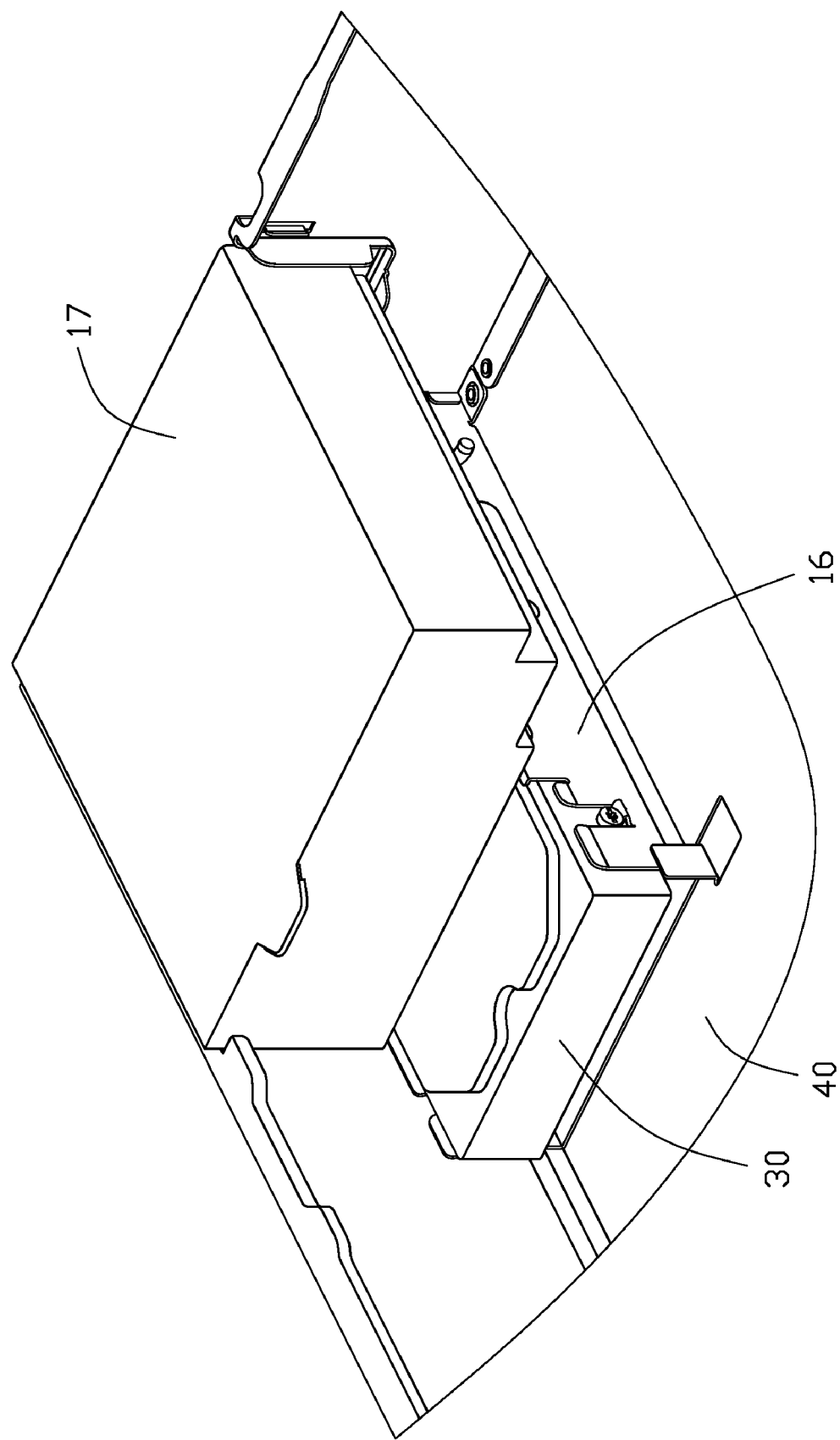
FIG. 3 is an assembled view of FIG. 1, showing the storage device fully attached to the bracket.

A plurality of sliding members 31 are formed on the two sides of the storage device 30 to engage with the openings 13. A diameter of the sliding members 31 is substantially equal to a width of the openings 13. Referring to FIGS. 1 and 3, in assembly, a back portion of the bracket 16 is secured on the back plate of the computer chassis 40 by screws. The sliding members 31 of the storage device 30 are slid into corresponding openings 13. When the sliding members 31 resist the supporting members 14 at the bottom of corresponding openings 13, the fixing protrusions 176 of the pressing member 17 are slid into corresponding fixing slots 15. A back portion of the pressing member 17 is secured on the back plate of the computer chassis 40 by screws. Then, a cover plate (not labeled) of the computer chassis 40 is fixed on the computer chassis 40, and the cover plate (not labeled) elastically resists the pressing member 17 to fix the storage device 30 onto the bracket 16. The biasing members 19, 173, and the supporting members 14 are elastic slices for shock absorption. The storage device 30 is protected from being damaged when the computer chassis 40 is moved or delivered. The mounting mechanism 10 attaches the storage device 30 to the computer chassis 40 by the openings 13, the supporting members 14, and the pressing members 19, 173 on the bracket 16 and the pressing member 17. It is easy and convenient to fix the storage device 30 onto the bracket 16, and the screws are not needed.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting mechanism for a storage device having at least one sliding member, comprising:
   a bracket for receiving the storage device therein, the bracket comprising a sidewall defining at least one opening for receiving the at least one sliding member of the storage device;
   a pressing member attached to the sidewall of the bracket for sandwiching the storage device between a bottom surface of the pressing member and the bracket; and
   at least one supporting member formed at a bottom position of the at least one opening; wherein the at least one sliding member is configured to be slid into the at least one opening and abut the at least one supporting member; and the at least one supporting member is elastically deformed to support the storage device, wherein the at least one supporting member is an elastic slice of metal bent from the bottom position of the at least one opening.

2. The mounting mechanism of claim 1, wherein a plurality of fixing slots are formed at a back portion of the sidewall, the pressing member comprises a plurality of fixing protrusions defined at a back portion of one side of the pressing member to engage the plurality of fixing slots.

3. The mounting mechanism of claim 1, wherein a width of the at least one sliding member is substantially equal to a width of the at least one opening.

4. The mounting mechanism of claim 1, wherein the pressing member is a power supply.

5. The mounting mechanism of claim 1, wherein the pressing member comprises a plurality of first slots and a plurality of first biasing members extended from the plurality of first slots on the bottom surface of the pressing member.

6. The mounting mechanism of claim 5, wherein each first biasing member comprises an elastic element extended slantwise from the corresponding first slot, and a horizontal member formed at an end portion of each elastic element.

7. The mounting mechanism of claim 6, wherein the supporting member is integrally formed with the sidewall of the bracket, and the plurality of first biasing members are integrally formed with the bottom surface of the pressing member.

8. A mounting mechanism for a storage device having at least one sliding member, comprising:
   a computer chassis;
   a bracket defining at least one opening in a sidewall thereof for receiving said sliding member of the storage device;
   a pressing member attached to the sidewall of the bracket for sandwiching the storage device between a bottom surface of the pressing member and the bracket, and
   at least one supporting member formed at a bottom position of the at least one opening; wherein the at least one sliding member is configured to be slid into the at least one opening and abut the at least one supporting member; the supporting member is elastically deformed to support the storage device, wherein the at least one supporting member is an elastic slice of metal bent from the bottom position of the at least one opening, and a cover plate of the computer chassis resists the pressing member to fix the storage device onto the bracket.

9. The mounting mechanism of claim 8, wherein a plurality of fixing slots are formed at a back portion of the sidewall, the pressing member comprises a plurality of protrusions defined on a back portion of one side of the pressing member to engage the plurality of fixing slots.

10. The mounting mechanism of claim 9, wherein the slots are arcuate.

11. The mounting mechanism of claim 8, wherein the pressing member comprises a plurality of first slots and a plurality of first biasing members extended from the plurality of first slots on the bottom surface of the pressing member.

12. The mounting mechanism of claim 11, wherein each first biasing member comprises an elastic element extended slantwise from the corresponding first slot, and a horizontal member formed at an end portion of each elastic element.

13. The mounting mechanism of claim 1, wherein the bracket further comprises a bottom wall extended perpendicularly from a side edge of the sidewall; and at least one second slot and a second biasing member extended from the at least one second slot are formed on the bottom wall.

14. The mounting mechanism of claim 8, wherein the bracket further comprises a bottom wall extended perpendicularly from a side edge of the sidewall; and at least one second slot and a second biasing member extended from the at least one second slot are formed on the bottom wall.

* * * * *